United States Patent

Timmons

[11] Patent Number: 5,587,087
[45] Date of Patent: Dec. 24, 1996

[54] METHOD AND APPARATUS FOR TREATING LIQUIDS

[76] Inventor: Alban Timmons, 7 Cartwright La. Beverley, North Humberside, Great Britain, HU17 8NB

[21] Appl. No.: 416,852
[22] PCT Filed: Aug. 12, 1994
[86] PCT No.: PCT/GB94/01771
§ 371 Date: May 30, 1995
§ 102(e) Date: May 30, 1995
[87] PCT Pub. No.: WO95/05345
PCT Pub. Date: Feb. 23, 1995

[30] Foreign Application Priority Data

Aug. 16, 1993 [GB] United Kingdom ............... 9317026

[51] Int. Cl.$^6$ .................................................. C02F 1/66
[52] U.S. Cl. ..................... 210/724; 210/201; 210/202; 210/205; 210/512.1; 210/532.1; 210/537; 210/788
[58] Field of Search .................. 210/724, 723, 210/201, 202, 205, 512.1, 532.1, 537, 788

[56] References Cited

U.S. PATENT DOCUMENTS

| 3,788,469 | 1/1974 | Hirsch et al. | 210/788 |
| 3,989,628 | 11/1976 | Bier | 210/788 |
| 4,146,468 | 3/1979 | Wilson | 210/788 |
| 4,278,550 | 7/1981 | Watts | 210/788 |
| 4,855,065 | 8/1989 | Keeter et al. | 210/788 |
| 4,863,617 | 9/1989 | Katch et al. | 210/788 |
| 5,082,560 | 1/1992 | Eli et al. | 210/788 |
| 5,368,747 | 11/1994 | Rymal, Jr. et al. | 210/788 |

Primary Examiner—Neil McCarthy
Attorney, Agent, or Firm—William A. Drucker

[57] ABSTRACT

The invention is concerned with clarifying contaminated liquids and, in one described embodiment, contaminated liquid is continuously supplied to a first vessel, a first treatment material is intimately mixed into the contaminated liquid in the first vessel, the contaminated liquid/first treatment mixture is passed to a second vessel and a second treatment material is added to the contaminated liquid and first material mixture and intimately mixed therewith.

The first treatment material preferably comprises one or more compound of the group including soluble magnesium salts, ferrous salts, manganous compounds and cuprous compounds and the second material is an alkali intended to reduce the pH of the final mixture.

After the second treatment material has been added the impurities separated out from the final mixture are extracted from one outlet from the second vessel and clarified liquid is discharges from another outlet of the second vessel.

31 Claims, 1 Drawing Sheet

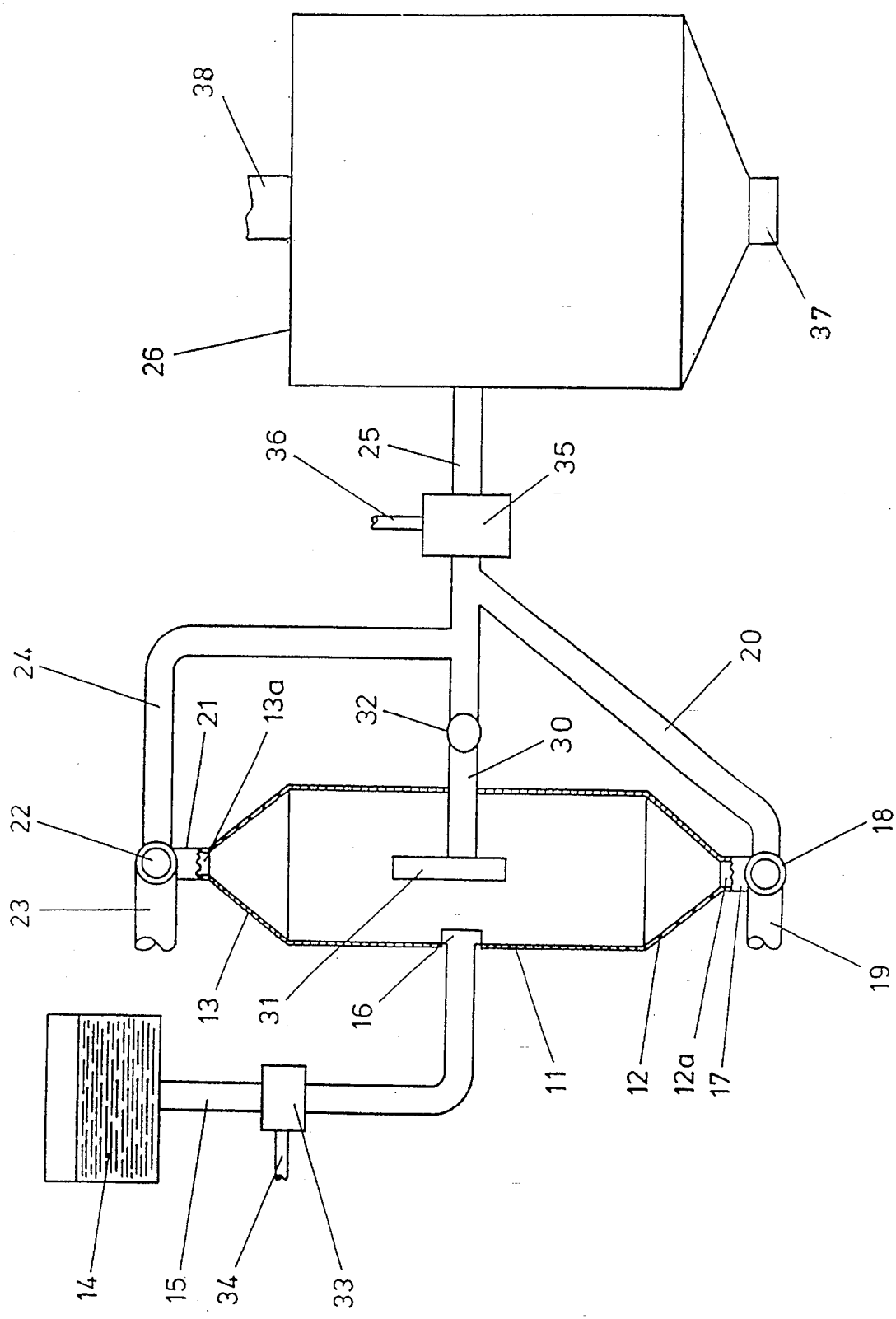

METHOD AND APPARATUS FOR TREATING LIQUIDS

The present invention relates to a method of, and apparatus for, treating liquids and has particular application to the treatment of water.

The problems in the disposal of contaminated liquids are well known in the art and the treatment of such liquids contaminated by particulate matter generally comprises the steps of removing the greater part of the contaminates from the liquid to allow the clarified liquid to be discharged safely into the environment and to treat the extracted contaminates, as by recovering reusable contaminates or treating said contaminates to render said contaminates less harmful to the environment and into a condition in which the treated contaminates can be safely disposed of.

Whilst the treatment of contaminated liquids to remove solids materials in divided form therefrom is well known in the art, and conventional treatments may include the use of flocculants or coagulants and/or sedimentation, the problems of removing such particulates of solids increases as the size of the particles of the contaminant reduces. Further, the expense of removing solids particles increase as the size of the particles reduces and the conventional methods for clarifying contaminated liquids are substantially ineffective, and expensive, when the contaminate is in solution.

Whilst the use of aluminium salts and iron salts to produce their hydroxides does give some partial removal of, for example, dyestuffs in micro-particulate form or in solution such a process gives only partial removal of the dyestuff and the disposal of water contaminated by dyestuffs is a major problem.

The present invention seeks to provide a method of, and apparatus for, treating contaminated liquids to remove therefrom fine particles and contaminates in solution in the liquid.

According to the present invention there is provided a method for treating a contaminated liquid comprising the steps of adding to the contaminated liquid a first treatment material selected from the group including soluble magnesium salts, ferrous salts, manganous compounds and cuprous compounds, intimately mixing the treatment material into the contaminated liquid and then raising the pH of the contaminated liquid to a value in excess of 9.5 and separating clarified liquid from the contaminant.

According to one aspect of the present invention there is provided a method for treating a contaminated liquid comprising the steps of intimately mixing a soluble magnesium salt into the contaminated liquid, treating the contaminated liquid and magnesium salt mixture to raise the pH to a value above 9.5 and then separating the clarified liquid from the contaminant.

According to another aspect of the invention there is provided a method for treating a contaminated liquid comprising the steps of intimately mixing a ferrous salt into the contaminated liquid, treating the contaminated liquid and ferrous sulphate mixture to raise the pH to a value above 9.5 and then separating clarified liquid from the contaminant.

According to a further aspect of the present invention there is provided a method for treating a contaminated liquid comprising the steps of intimately mixing a manganous compound into the contaminated liquid, treating the contaminated liquid and manganous compound mixture to raise the pH to a value above 9.5 and then separating the clarified liquid from the contaminant.

According to a still further aspect of the present invention there is provided a method for treating a contaminated liquid comprising the steps of intimately mixing a cuprous compound into the contaminated liquid, treating the contaminated liquid and cuprous compound mixture to raise the pH to a value above 9.5 and then separating the clarified liquid from the contaminant.

Preferably the method includes the steps of raising the pH to a value above 9.5 by adding an alkali to the contaminated liquid and magnesium salt mixture.

In one embodiment in accordance with the invention the method includes the steps of selecting the alkali to comprise hydrated lime.

In another embodiment the method comprises the steps of selecting the alkali to comprise caustic soda.

In one embodiment in accordance with the invention the method includes the steps of selecting the soluble magnesium salt to include magnesium chloride.

In another embodiment the method includes the steps of selecting the soluble magnesium salt to include magnesium sulphate.

In one embodiment in accordance with the invention the method includes the steps of selecting the ferrous salt to comprise ferrous chloride.

Preferably the method includes the steps of treating the contaminated liquid by a conventional water treatment method to remove particulate materials therefrom before treating said liquid with the soluble magnesium salt.

Preferably the pH of the contaminated liquid and treatment material is raised to a value above 10.0 and most preferably above 10.2.

The invention also envisages apparatus for performing the method according to the invention and, in accordance with this aspect of the invention, the apparatus comprising a vessel for containing a contaminated liquid and a treatment material, means for intimately mixing the contaminated liquid and the treatment material in said vessel, means for adding a pH adjusting material to the contaminated liquid/treatment material mixture in the vessel and means for drawing clarified liquid from said vessel.

According to this aspect of the invention the method comprises the steps of continually passing the contaminated liquid through a first vessel, adding said first treatment material to said liquid in, or immediately preceding entry into, said first vessel, passing the contaminated liquid/first treatment mixture from said first vessel to a second vessel, adding said second material in, or immediately preceding, entry of liquid from said first vessel to said second vessel and removing clarified liquid from an outlet from said second vessel and concentrated impurities from another outlet from said second vessel.

Preferably the method is characterised by the steps or providing the first vessel and the second vessel with tangential flow inlets to induce circulating flows in the liquids in said vessels.

In one embodiment in accordance with the invention the apparatus includes means for metering the treatment material into the contaminated liquid being supplied to said vessel.

Preferably the apparatus for performing the method is characterised in that the contaminated liquid is supplied to a first vessel, the contaminated liquid/first treatment material mixture is supplied to a second vessel and said second vessel includes an outlet for clarified liquid and an outlet for concentrated contaminates.

In one embodiment in accordance with the invention the vessel comprises a generally cylindrical vessel with a conical bottom, means for continuously supplying contaminated liquid and the treatment material, tangentially into the vessel to cause circulating flows within the vessel and means for adding a pH adjusting material to the contaminated liquid/treatment material mixture, said vessel including an outlet for clarified liquid and an outlet for accumulated contaminate.

The amounts of first treatment material added to the contaminated liquid is preferably greater than 200 mg/liter, more preferably 250 mg/liter and most preferably greater than 300 mg/liter. However, certain heavily contaminated liquids may require doses of up to 1000 mg/liter.

The amount of pH adjusting material added to a contaminated liquid/first treatment material mixture will preferably comprise an amount greater than 255 mg/liter, more preferably in excess of 250 mg/liter and most preferably in excess of 300 mg/liter.

Preferably the apparatus is characterised by a first vessel comprising a substantially cylindrical vessel arranged with its axis substantially vertical.

In one embodiment the apparatus is characterised by means for removing heavy contaminates from the lower regions of the pre-treatment vessel and means for extracting partially de-contaminated liquid from the upper regions of the said vessel.

In another embodiment the apparatus is characterised by means for extracting light contaminates from an upper region of the first vessel and means for extracting partially de-contaminated liquid from the lower regions of said vessel.

In a further embodiment the apparatus is characterised by means for extracting light contaminates from the upper regions of the first vessel, means for removing heavy contaminates from the lower regions of said vessel and means for removing treated contaminated liquid from a mid-height region of the first vessel.

Preferably the apparatus is characterised by means for introducing a treatment material into the contaminated base liquid being supplied to said first vessel.

Preferably the apparatus includes means for mixing the said treatment material into said contaminated base liquid.

Preferably the apparatus includes means for mixing a second treatment material into the liquid being supplied from said first vessel to the second vessel.

In a preferred embodiment the said means for mixing comprise a vortex valve mixing device.

The invention will now be described further by way of example with reference to the accompanying drawings in which the single figure shows, diagrammatically and partially in cross-section, a separator apparatus in accordance with the invention.

In the illustrated embodiment a first vessel 11, of generally cylindrical form, is arranged with its central axis substantially vertically, the lower regions of the vessel are defined by a conical bottom 12 and the upper regions of the vessel are defined by a conical top 13. A central aperture 12a in the bottom 12 defines an outlet for heavy contaminates and a central outlet 13a, in the top 13, defines an outlet for light contaminates.

The vessel 11 is supplied with contaminated base liquid from a header tank 14, which discharges into the vessel 11 via a duct 15. The duct 15 opens into the mid-height region of the vessel 11 and, via a tangential flow device 16, the liquid from duct 15 is discharged tangentially into the vessel 11 to generate circulating flow therein.

Tangential devices 16 are well known in the art and are described in detail in, for example, the British Patent Publication Nos 2205512 and 2158741 and, accordingly, no further description thereof is necessary.

With the tangential device 16 generating circulating flows about the central axis of the vessel 11, and which circulating flows essentially develop laminar flows in the liquid, heavy contaminates in the liquid are allowed to fall under gravity to the bottom 12 and light contaminates flow upwardly within the vessel to the top 13.

The aperture 12a in the bottom 12 of the vessel 11 opens to a flow passage 17, which connects with a valve 18. The valve 18, when open, ducts liquid from the flow passage 17 to a duct 19, which leads to an exhaust.

In like manner the aperture 13a in the top 13 is open to a flow passage 21 which extends to a valve 22. The valve 22, when open, ducts the liquid from flow passage 21 to a duct 23, extending to an exhaust.

A duct 25 constitutes an inlet duct from the vessel 11 to a second vessel, such as a separator 26, conveniently a separator of the type published in PCT Patent Application No PCT/GB92/01904.

In one mode for operating the apparatus described thus far, and when a contaminated base liquid to be processed include a large volume of heavy contaminates, the valve 18 is set to duct the flows from flow passage 17 through to exhaust duct 19. At the same time the valve 22 is so positioned that flows from flow passage 21 to duct 23 are closed.

With the valves 18 and 22 so set, and with the vessel 11 charged with contaminated liquid, the heavily contaminated liquid entering the vessel 11 via the duct 15 and tangential device 16, the greater part of the heavy contaminates entering the vessel 11 fall rapidly down the vessel 11 to the conical bottom 12, down the sloping wall of conical bottom 12 into the flow passage 17 and to exhaust, via the duct 19.

Thus, by this mode of operating the first vessel 11, the greater part of the heavy contaminates are removed from the contaminated liquid before said liquid is passed into the conventional separator 26.

In another mode of operation, when the contaminated liquid includes a large volume of light contaminates, the valve 22 is positioned to duct liquid from the flow passage 21 to the exhaust duct 23, and the valve 18 may be set to allow limited flow through passage 17 to the outlet duct 19.

Thus, in this mode of operation, the light contaminates entering the vessel 11 are allowed to flow upwardly within the vessel 11 and therefrom through the aperture 13 to flow passage 21 and through the valve 22 to the exhaust duct 23.

The vessel 13 further includes a duct 30, which extends from the duct 25, through the wall of the vessel 11 and terminates in a vertical duct 31, open at both ends and having its axis concentric with the axis of the vessel 11. The upper open end of the duct 31 lies above the horizontal plane passing through tangential device 16 and the lower open end of the duct 31 lies below said plane. The duct 30 conveniently includes a valve 32.

In operating the apparatus the valve 18 is positioned to discharge all the heavy contaminates falling through the aperture 12a to the exhaust 19, the valve 22 is positioned to discharge all the light contaminates rising through the aperture 13a to exhaust 23 and the partially de-contaminated liquid is taken off through the duct 31, the duct 30, and through the valve 32 to the duct 25 supplying the separator 26.

It will be appreciated that when the liquid has a large volume of light or heavy contaminates the flow rates through the relevant contaminates flow passage 17 or 21 will be controlled so that the maximum volume of contaminates with the minimum volume of liquid is passed to exhaust.

It will be observed that in the above described embodiment the contaminated liquid is supplied to the vessel under a substantially constant hydraulic head and with the cross sectional area of the duct 15 greater than the sum of the cross-sectional areas of all the outlets 12a, 13a and 31, a substantially uniform supply of partially contaminated liquid to the separator 26 is obtained.

The apparatus as illustrated also includes a mixing device 33, for example a vortex device, in the supply conduit 15 and by way of which a first treatment material is added to the contaminated liquid, via a duct 34. Thus, the treatment material can be continuously added to the contaminated liquid and intimately mixed therewith in the device 33. The mixing and distribution of the treatment material through the contaminated liquid will continue as the liquid passes into and through the vessel 11 and the residence time of the treated liquid in the vessel 11 will allow the treatment material to be effective mixed with the contaminated liquid before being passed to the separator 26.

According to the invention the treatment materials added to the contaminated liquid may advantageously comprise a soluble magnesium salt or a ferrous salt.

The apparatus also includes a further vortex valve 35, in the duct 25, and via which a pH adjustment material, conveniently an alkali, is added to the contaminated liquid/first treatment material mixture, via a duct 36.

It will now be apparent that the apparatus illustrated allows a first treatment material to be added to the contaminated liquid, intimately mixed throughout said material within the vessel 11, before the treated liquid is passed to the separator 26, and the apparatus also allows a second treatment material to be introduced into the contaminated liquid and treatment material, and intimately mixed with the contaminated liquid/first treatment material mixture before said mixture is passed to the separator 26.

Thus, with the above described embodiment, contaminated liquid, which may include heavy or light contaminates including micro-fine contaminates or contaminates in solution, is roughly mixed with a soluble first treatment material in the device 33, the treated liquid is passed through the first vessel 11, which allows the greater part of the heavy and/or light contaminates to be removed from the liquid due to the circulating flows in the vessel 11 and the circulating flows in the vessel 11 effect a thorough mixing of the soluble first treatment material into the contaminated liquid. With the greater part of the heavy contaminates and/or light contaminates removed from the vessel 11 the partially clarified liquid, with the soluble first treatment material intimately mixed therein, is passed to the second mixing device 35, wherein the second treatment material is added before the partially clarified liquid, with the first treatment material in solution therein together with the second treatment material, is passed into the separator 26.

The second treatment material, in raising the pH of the liquid, causes the first treatment material to come out of solution in the partially clarified liquid, forming micro-fine particles distributed relatively uniformly through the liquid, and these micro-fine particles attract, and flocculate with, the remaining contaminate in the liquid and, when said flocculated particles are "heavy" they are removed via the duct 37 and when light said flocculated particles are removed through the outlet 38.

Thus, the flocculated particles move either upwardly or downwardly within the separator 26, due to the circulating flows in said separator 26, and clarified liquid is removed from the separator 26.

The invention will now be described further by way of the following examples and for which Table 1 shows the effects of certain of the first materials on differently contaminated liquids;

TABLE 1

| Effluent | MgCl$_2$ | FeCl$_2$ | NaOH | Colour of RAW | Colour of Treated | Suspended Solids on Treated | Reductio in COD |
|---|---|---|---|---|---|---|---|
| Factory A (Coated Papers) | | 250 ppm | 400 ppm | Purple | Clear | 0 | 50% |
| Velvet B | 1000 ppm | | 1000 ppm | Blue | Clear | 0 | 48% |
| Manufacture (Dye) | | 1000 ppm | 1000 ppm | Blue | Clear (brown tint) | 0 | 49% |
| C Textile Print Dye | 1000 ppm | | 1000 ppm | Brown | Clear | 0 | 67% |
| | | 500 ppm | 700 ppm | Brown | Clear (red tint) | 0 | 64% |
| D Dye House | 750 ppm | | 600 ppm | Purple | Clear | 0 | 73% |
| | | 700 ppm | 500 ppm | Purple | Clear | 0 | 70% |
| E Carpet Pile Dye | 500 ppm | | 1000 ppm | Red | Clear (brown tint) | 0 | 42% |
| | | 500 ppm | 700 ppm | Red | Clear (brown tint) | 0 | 47% |
| F Carpet Dye | 500 ppm | | 800 ppm | Green | Clear | 0 | 49% |

As stated hereinbefore the separator 26 may conveniently comprise a separator identical to the separator published in PCT Patent Application No GB92/01904 and wherein the liquid supplied to the separator 26 via duct 25 is introduced tangentially into the separator 26 (in similar manner to the tangential inlet 16), a tangential introduction of the liquid into the separator 26 generates circulating flows which afford an intimate mixing of the material supplied to the separator 26 and "heavy" contaminates in said liquid fall to the bottom of the separator 26 and are removed via an outlet 37 in the bottom of the separator 26 whilst clarified liquid is removed from an outlet 38 in the upper regions of the separator 26. In the event that the contaminates in the liquid in separator 26 are light contaminates said light contaminates are removed from the separator 26 via the outlet 38 whilst clarified liquid is removed from the separator 26 via the outlet 37.

Sample F was inspected for Insecticide removal typified by the following:

| Permethrin Removal | |
|---|---|
| Sample 1 | |
| Raw Effluent | 0.63 microgrammes/liter |
| Treated Effluent | 0.06 microgrammes/liter |
| | % Reduction 90.5% |
| Sample 2 | |
| Raw Effluent | 1.92 microgrammes/liter |
| Treated Effluent | 0.14 microgrammes/liter |
| | % Reduction 92.7% |

The method described will also remove many insecticidual/complex organic substances. As shown in the examples. Since the treated samples are free from suspended solids and colour, simple carbon filtration virtually eliminates Permethrin from sample.

When the method is applied using Magnesium Salts with Hydrated Lime heavy metals are also removed.

Algal growths—including blue green algae are also removed and resisual levels of phosphage can be reduced to levels below mg/liter.

EXAMPLE 2

Effluent from dyestuffs and pigment manufacture

| | ph Value | COD (mg/l) | Colour |
|---|---|---|---|
| Raw Effluent | 2.0 | 4760 | Black |
| Treated Sample | 10.0 | 1575 | Nil |

| Lab No | Zn | Cu | Cr | As | Hg |
|---|---|---|---|---|---|
| 260 | 1.278 | 0.344 | 4.763 | 0.269 | 4.06 ug/l |
| 261 Raw | 0.030 | 0.132 | 0.048 | 0.012 | 5.50 ug/l |
| 262 Treated | 0.050 | 0.041 | 0.026 | not detectable | zero |
| 264 Treated | 0.015 | 0.133 | not detectable | not detectable | zero |
| 265 Treated | 0.049 | 0.020 | not detectable | not detectable | zero |
| 267 Treated | 0.061 | 0.020 | not detectable | not detectable | zero |

All Values in Part Per Million unless where stated

I claim:

1. A method for treating a contaminated liquid in a first vessel comprising a light contaminants outlet through which light contaminants can be extracted in upper regions of the vessel and a heavy contaminants outlet through which heavy contaminants can be extracted in lower regions of the vessel and a mid-height outlet in a mid-height region of the vessel, said mid-height outlet comprising a vertical duct open at both ends and having its axis concentric with the axis of the vessel comprising the steps of adding to the contaminated liquid a first treatment material selected from the group consisting of soluble magnesium salts, ferrous salts, manganous compounds, cuprous compounds, and nickel II, intimately mixing the first treatment material into the contaminated liquid and then raising the pH of the contaminated liquid to a value in excess of 8, and separating clarified liquid from the contaminant.

2. A method according to claim 1 comprising the steps of raising the pH of the contaminated liquid/first treatment material, by adding a second treatment material.

3. A method according to claim 2 comprising the steps of selecting the second treatment material to comprise an alkali material.

4. A method according to claim 2 comprising the steps of selecting the second treatment material to include hydrated lime.

5. A method according to claim 2 comprising the steps of selecting the second treatment material to include caustic soda.

6. A method according to claim 2 comprising the steps of selecting the second treatment material to include magnesium chloride.

7. A method according to claim 2 comprising the steps of selecting the second treatment material to include magnesium sulphate.

8. A method according to claim 2 comprising the steps of selecting the second treatment material to comprise ferrous salts.

9. A method according to claim 1 comprising the steps of raising the pH to a value above 9.5.

10. A method according to claim 9 characterised by the steps of raising the pH to above 10.2.

11. A method according to claim 1 comprising the steps of treating the contaminated liquid by a conventional water treatment method to remove particulate materials therefrom before treating said liquid with the first treatment material.

12. A method according to claim 1 wherein the amount of first treatment material added to each liter of the contaminated liquid is greater than 100 mg.

13. A method according to claim 12 wherein the amount of first treatment material added to each liter of the contaminated liquid is greater than 250 mg.

14. A method according to claim 12 wherein the amount of first treatment material added to each liter of the contaminated liquid is greater than 300 mg.

15. A method according to claim 12 wherein the amount of first treatment material added to each liter of the contaminated liquid is greater than 1,000 mg.

16. A method according to claim 2 wherein the amount of second treatment material added to each liter of contaminated liquid/first treatment material mixture, comprises an amount greater than 100 mg.

17. A method according to claim 2 wherein the amount of second treatment material added to each liter of contaminated liquid/first treatment material mixture comprises an amount greater than 250 mg.

18. A method according to claim 2 wherein the amount of second treatment material added to each liter of contaminated liquid/first treatment material mixture comprises an amount greater than 300 mg.

19. Apparatus for treating a contaminated liquid, comprising a first vessel for containing a contaminated liquid and a first treatment material, said vessel comprising a light contaminants outlet through which light contaminants can be extracted in upper regions of the vessel and a heavy contaminants outlet through which heavy contaminants can be extracted in lower regions of the vessel and a mid-height outlet in a mid-height region of the vessel, said mid-height outlet comprising a vertical duct open at both ends and having its axis concentric with the axis of the vessel, means for intimately mixing the contaminated liquid and the treatment material in said vessel, means for reducing pH of the contaminated liquid/treatment material mixture in the vessel and means for drawing clarified liquid from said vessel.

20. A method according to claim 1 comprising the steps of continually passing the contaminated liquid through said first vessel, adding said first treatment material to said liquid in, or immediately preceding entry into, said first vessel, passing the contaminated liquid/first treatment mixture from said first vessel to a second vessel, adding said second material in, or immediately preceding, entry of liquid from said first vessel to said second vessel and removing clarified liquid from an outlet from said second vessel and concentrated impurities from another outlet from said second vessel.

21. A method according to claim 20 comprising providing the first vessel and the second vessel with tangential flow inlets to induce circulating flows in the liquids in said vessels.

22. Apparatus as set forth in claim 19 further comprising a second vessel for receiving contaminated liquid/first treatment material mixture from said first vessel, said second vessel including an outlet for clarified liquid and an outlet for concentrated contaminants.

23. Apparatus according to claim 22 wherein said vessel, or each of said vessels, comprises a substantially cylindrical vessel arranged with its axis substantially vertical.

24. Apparatus according to claim 22, comprising means for removing heavy contaminates from the lower regions of the first vessel and means for passing partially de-contaminated liquid from the upper regions of the said first vessel to the second vessel.

25. Apparatus according to claim 22 comprising means for extracting light contaminates from an upper region of the first vessel and means for passing partially de-contaminated liquid from the lower regions of said first vessel to said second vessel.

26. Apparatus according to claim 24 comprising means for extracting light contaminates from the upper regions of the first vessel, means for removing heavy contaminates from the lower regions of said first vessel and means for passing partially de-contaminated liquid from a mid-height region of the first vessel to said second vessel.

27. Apparatus according to claim 22 comprising means for introducing the first treatment material into the contaminated base liquid whilst said liquid is being supplied to said fist vessel.

28. Apparatus according to claim 22 comprising means for mixing the said first treatment material into said contaminated base liquid.

29. Apparatus according to claim 22 comprising means for mixing a second treatment material into the liquid being supplied from said first vessel to said second vessel.

30. Apparatus according to any one of claim 19 wherein the said means for mixing comprise a vortex valve mixing device.

31. Apparatus according to any of claim 22 wherein the contaminated liquids are supplied to the first and second vessels tangentially of said vessels to create circulating liquid flows in said vessels.

* * * * *